United States Patent
Cha et al.

(10) Patent No.: US 7,334,942 B2
(45) Date of Patent: Feb. 26, 2008

(54) DUAL SEAL ASSEMBLY FOR BEARING

(75) Inventors: Cheol Hwan Cha, Gyeongsangnam-do (KR); Dae Yong Lee, Gyeongsangnam-do (KR); Kook Hwan Shin, Daejeon Metropolitan (KR)

(73) Assignee: Schaeffler Korea Corp., Changwon (KR)

( * ) Notice: Subject to any disclaimer, the term of this patent is extended or adjusted under 35 U.S.C. 154(b) by 658 days.

(21) Appl. No.: 10/844,309

(22) Filed: May 13, 2004

(65) Prior Publication Data

US 2004/0228558 A1    Nov. 18, 2004

(30) Foreign Application Priority Data

May 16, 2003    (KR) .................... 10-2003-0031162

(51) Int. Cl.
*F16C 33/76* (2006.01)
*F16J 15/32* (2006.01)

(52) U.S. Cl. ...................... 384/480; 384/484

(58) Field of Classification Search ............ 384/480, 384/481, 482, 484, 486
See application file for complete search history.

(56) References Cited

U.S. PATENT DOCUMENTS

| 3,685,841 | A | * | 8/1972 | Keller ............... 277/571 |
| 4,226,426 | A | * | 10/1980 | Messenger ........... 277/353 |
| 4,516,783 | A | | 5/1985 | Mitsue et al. |
| 4,799,808 | A | | 1/1989 | Otto |
| 5,015,001 | A | | 5/1991 | Jay |
| 5,096,207 | A | | 3/1992 | Seeh et al. |
| 5,269,536 | A | | 12/1993 | Matsushima et al. |
| 5,292,199 | A | | 3/1994 | Hosbach et al. |
| 5,458,420 | A | * | 10/1995 | Otto ............... 384/448 |
| 5,553,870 | A | | 9/1996 | Czekansky et al. |
| 5,997,005 | A | * | 12/1999 | Gold et al. ............ 277/402 |
| 6,082,905 | A | | 7/2000 | Vignotto et al. |
| 6,170,992 | B1 | | 1/2001 | Angelo et al. |
| 6,217,225 | B1 | | 4/2001 | Shimizu et al. |
| 6,257,587 | B1 | | 7/2001 | Toth et al. |
| 6,280,093 | B1 | | 8/2001 | Ohtsuki et al. |
| 2002/0001422 | A1 | | 1/2002 | Maldera et al. |
| 2002/0131659 | A1 | | 9/2002 | Rutter et al. |

* cited by examiner

*Primary Examiner*—William C. Joyce
(74) *Attorney, Agent, or Firm*—Dickstein Shapiro LLP

(57) ABSTRACT

A dual seal assembly for a bearing, the assembly comprising a first seal frame (12) coupled to a tip end of an opening in a space formed between an inner ring and an outer ring of the bearing and press-fitted to the outer ring; a second seal frame (14) press-fitted to the inner ring and a main seal member (16); a third seal frame (18) interposed between the first seal frame and the second seal frame, and press-fitted to one of the first and second seal frames; and an auxiliary seal member (20) inserted into the third seal frame to seal a gap formed between the first and second seal frames, such that the capacity of the bearing can be increased, the bearing can be compactly designed, an operational torque can be reduced, and the sealing performance can be improved making it easy for a user to easily handle the seal assembly before the seal assembly is mounted onto the bearing and to an apparatus.

2 Claims, 5 Drawing Sheets

DUAL SEAL ASSEMBLY FOR BEARING

FIELD OF THE INVENTION

The present invention relates to a bearing seal assembly and, more particularly, a dual seal assembly for a bearing adapted to dually seal a gap between an inner ring and an outer ring.

BACKGROUND OF THE INVENTION

In general, a bearing requires a sealing function and thus is disposed with a seal assembly equipped with a seal member at a tip end of an opening of a gap formed between an outer ring and an inner ring. The seal assembly comprises a first seal frame press-fitted to the outer ring, a second seal frame firmly press-fitted into the inner ring and a seal member for being inserted into at least one of the first and second seal frames to seal a gap formed between the first and second seal frames.

The seal assembly serves to simultaneously prevent leakage of oil (grease) from within the bearing to the outside and prevent intrusion of water, water steam, dust or the like into a bearing. The seal assembly also serves to maintain lubrication, prevent thermal resistance and support a load, which is the main function of the bearing, thereby enabling a smooth rotation.

However, there is a structural drawback in the seal assembly of the prior art thus described in that it either occupies a lot of space or little space. In other words, in order for a seal assembly to properly perform, there should be an appropriate amount of space occupied by the seal assembly. For instance, a bearing applied to an automobile hub is designated with a boundary condition and a prescribed space of the bearing is occupied by a seal assembly. When an occupied space of the seal assembly is made smaller, the capacity of the bearing can be increased. When the occupied space of the seal assembly is made larger, the function of the seal assembly can be improved, but the capacity of the bearing decreases such that design of the seal assembly has a close relationship not only with the sealing performance of the bearing but also with the capacity of the bearing, in other words, life of the bearing.

Another structural problem is an operational torque of a seal assembly itself. Generally, a seal assembly is formed with lip members made of resilient polymer abutting on a prescribed surface of a bearing or to a prescribed surface comprising the seal assembly for preventing intrusion of foreign objects and for sealing. The contact area of the lip members determines the sealing performance of the seal assembly and operational torque characteristics.

When the contact area (i.e. interference) between the lip members and the contact surface is large, the sealing performance improves but, as a result, the operational torque of the seal assembly itself increases due to excessive contact. The outcome of the increased operational torque results in an early wear and tear and a generation of heat in the lip members, thereby reducing the life of the seal assembly.

Meanwhile, when the interference is small between the lip members and the contact surface, the operational torque may be improved. However, prevention of intrusion of foreign objects and the sealing performance deteriorates, resulting in a poor sealing performance and bringing about an early leakage of oil (grease), intrusion of water or the like, and an early damage to the bearing.

A conventional seal assembly generally includes one or two seal frames and seal members with lips press-fitted into the seal frame. Before a bearing is installed to the seal assembly, the seal assembly itself is separately assembled and then axially disassembled from the bearing. Under this circumstance, a lot of time and cost is consumed prior to installing the bearing to the seal assembly. Once the seal assembly is disassembled, leakage of grease or the like in the seal assembly can be expected, thereby causing difficulty in handling the bearing.

SUMMARY OF THE INVENTION

The present invention is disclosed to solve the aforementioned structural drawbacks of the conventional seal assembly, and it is an object of the present invention to provide a compactly designed dual seal assembly for a bearing configured to increase the capacity of the bearing.

It is another object of the present invention to decrease the operational torque while increasing the sealing performance of a bearing.

It is still another object of the present invention to make it easy for a seal assembly to be easily handled before the seal assembly is installed on a bearing and an apparatus.

In accordance with a preferred embodiment of the present invention, there is provided a dual seal assembly for a bearing, comprising a first seal frame coupled to a tip end of an opening in a space formed between an inner ring and an outer ring of the bearing and press-fitted to the outer ring, a second seal frame press-fitted to the inner ring, and a main seal member fitted to at least one of the first seal frame and the second seal frame for sealing a space formed between the first seal frame and the second seal frame. The assembly further comprises a third seal frame interposed between the first seal frame and the second frame, and press-fitted to one of the first and second seal frames; and an auxiliary seal member inserted into the third seal frame to seal a gap between the first and second seal frames.

Preferably, the third seal frame is press-fitted into either the first seal frame or the second seal frame.

Preferably, the first seal frame comprises a first horizontal flange firmly inserted into an inner surface of the outer ring; and a first vertical flange vertically bent from an inner axial tip end of the first horizontal flange to an inner radial direction. The second seal frame comprises a second horizontal flange firmly inserted into an outer surface of the inner ring; and a second vertical flange vertically bent from an outer axial tip end of the second horizontal flange toward an outer radial direction, and axially inclined and vertically bent toward a radial outer direction. The third seal frame comprises a third horizontal flange firmly press-fitted to an inner surface of the first horizontal flange; and a third vertical flange vertically bent from an outer axial tip end of the third horizontal flange toward an inner radial direction, wherein a first prescribed gap is formed between an inner surface of the first vertical flange and an upper inner surface of the second vertical flange and functions as a first labyrinth, and a second prescribed gap is formed between an inner surface of the third horizontal flange and an upper end of the second vertical flange and functions as a second labyrinth.

Preferably, the auxiliary seal member is inserted into a lower end of the third vertical flange and a lip member thereof is firmly abutted on an outer surface of the second vertical flange for sealing.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENT

The preferred embodiments of the present invention will now be described in detail with reference to the annexed drawings, where the present embodiment is not limiting the scope of the present invention but is given only as an illustrative purpose.

Figure 1:
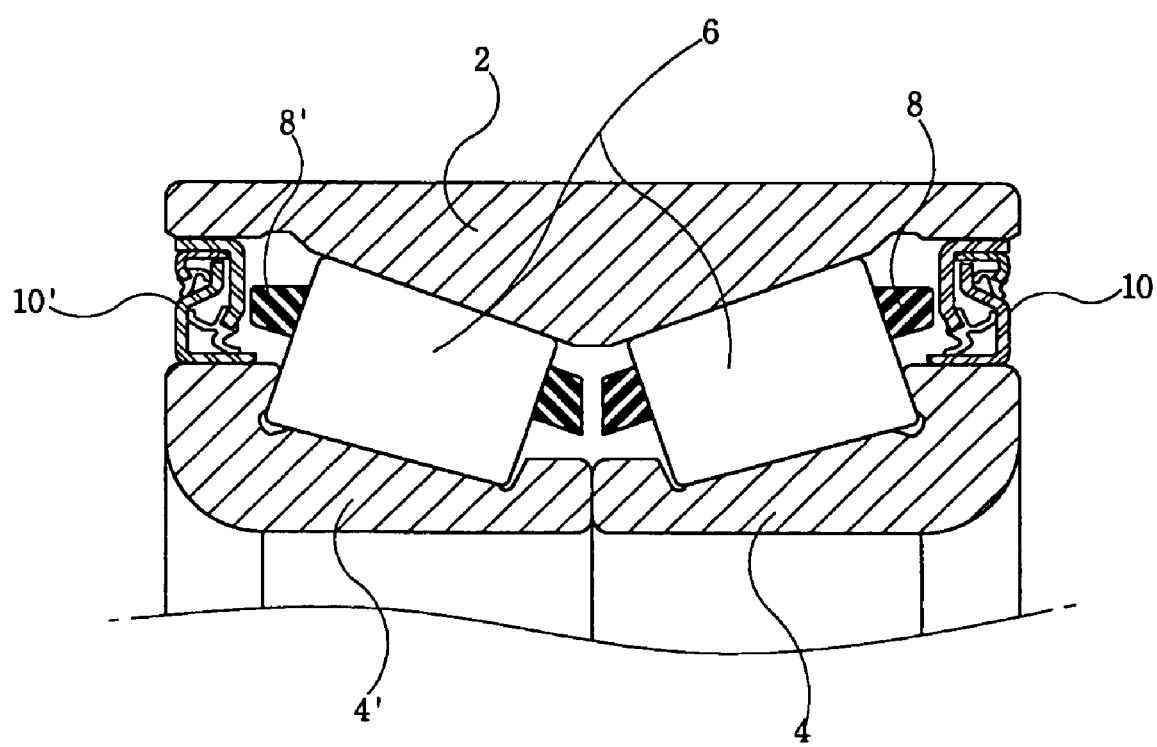
FIG. 1 is a partial cross-sectional view of a bearing applied with a dual seal assembly according to an embodiment of the present invention.

As shown in FIG. 1, a moving body (6) is slidingly coupled between an outer ring (2) and an inner ring (4, 4') of a bearing, and the moving body (6) is installed by guidance of a caging (8, 8'). An opening tip end of a space formed between the outer ring (2) and the inner ring (4, 4') is coupled with a dual seal assembly (10) for preventing leakage of grease and intrusion of foreign objects.

Figure 2:
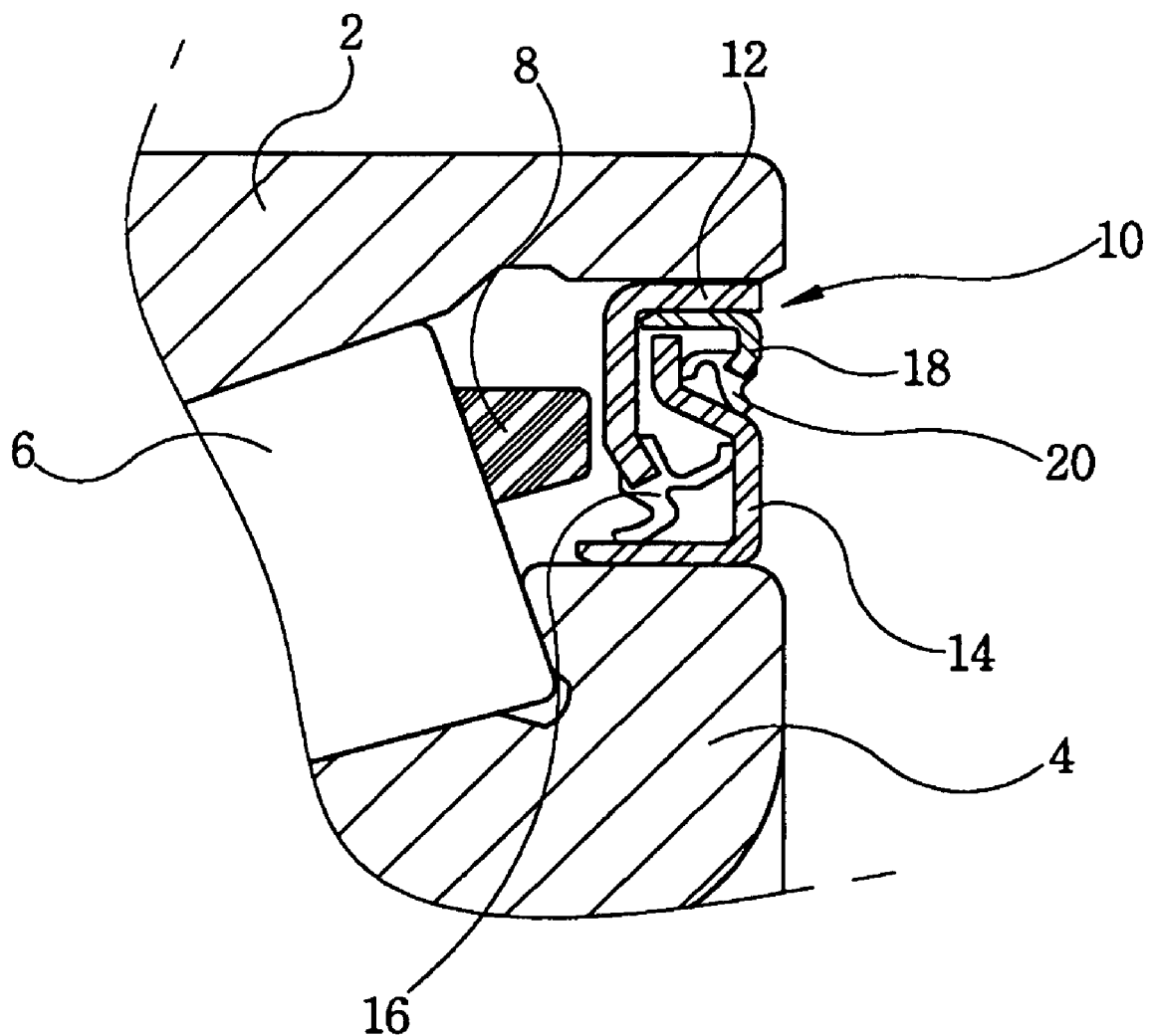
FIG. 2 is a detailed cross-sectional view of a part where the dual seal assembly of FIG. 1 is coupled.
Figure 3:
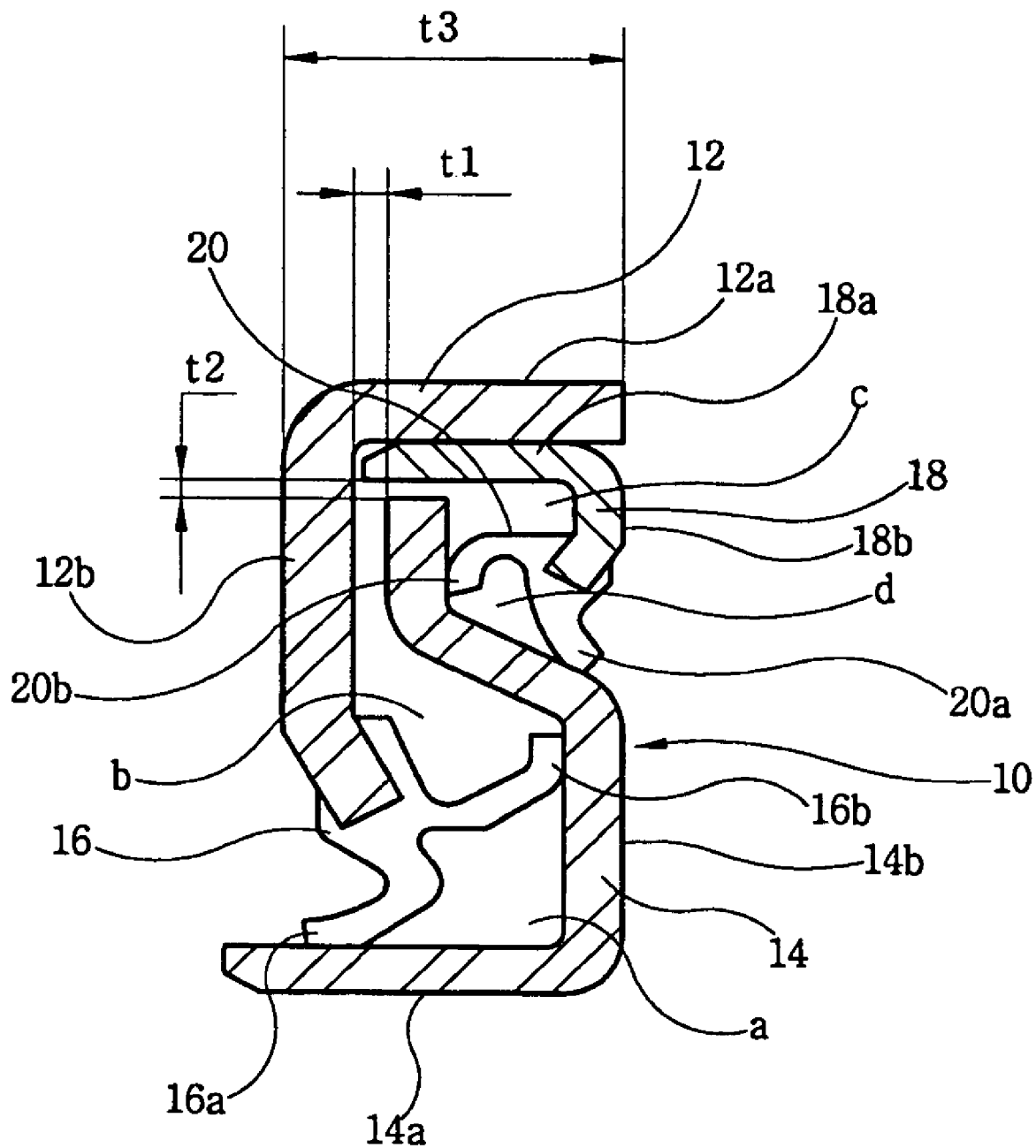
FIG. 3 is an exploded cross-sectional view of the dual seal assembly of FIG. 2.

As shown in FIGS. 2 and 3, the dual seal assembly (10) includes a first seal frame (12) press-fitted to the outer ring (2), a second seal frame (14) press-fitted to the inner ring (4), a main seal member (16) inserted into a distal end of the first seal frame (12) and firmly abutted on an inner surface of the second frame (14) to thereby seal a space between the first seal frame (12) and the second seal frame (14), a third seal frame (18) press-fitted to the first seal frame (12) and an auxiliary seal member (20) inserted into a distal end of the third seal frame (18) and firmly abutted on an outer surface of the second seal frame (14) to thereby seal a space between the third seal frame (18) and the second seal frame (14).

The dual seal assembly (10) has a dual sealing function in that a space formed between the outer ring (2) and the inner ring (4) is initially sealed by the first seal frame (12), the second seal frame (14) and the main seal member (16). Next, a space formed between the first seal frame (12) and the second seal frame (14) is sealed by the third seal frame (18) and the auxiliary seal member (20).

The first seal frame (12) integrally rotates with the outer ring (2), the second seal frame (14) integrally rotates with the inner ring (4) and the third seal frame (18) integrally rotates with the first seal frame (12) and the outer ring (2).

The first seal frame (12) includes a first horizontal flange (12a) firmly inserted into the inner surface of the outer ring (2) and a vertical flange (12b) vertically bent from an inner axial end of the first horizontal flange (12a) toward an inner radial direction. The first vertical flange (12b) is slantly bent at a distal end thereof toward the outer axial direction, and the distal end of the first vertical flange (12b) is inserted by the main seal member (16).

The second seal frame (14) includes a second horizontal flange (14a) firmly inserted into an outer surface of the inner ring (4) and a second vertical flange (14b) vertically bent from an outer axial end of the second horizontal flange (14a) toward an outer radial direction, slantly bent toward an inner axial direction and vertically bent toward an outer radial direction.

The third seal frame (18) includes a third horizontal flange (18a) firmly abutted and press-fitted to an inner surface of the first horizontal flange (12a), and a third vertical flange (18b) vertically bent from an outer axial end of the third horizontal flange (18a) toward an inner radial direction. The third vertical flange (18b) is slantly bent at a distal end thereof toward the inner axial direction, and the distal end of the third vertical flange (18b) is inserted by the auxiliary seal member (20).

A first gap (t1) of a prescribed size is formed between an inner surface of the first vertical flange (12b) and an upper inner surface of the second vertical flange (14b) to function as a first labyrinth. A second gap (t2) of a prescribed size is formed between an inner surface of the third horizontal flange (18a) and an upper end of the second vertical flange (14b) to function as a second labyrinth.

The third seal frame (18) may be press-fitted to the second seal frame (14) in response to changes in the position and shapes of the first and second seal frames (12,14).

The main seal member (16) includes a first main lip portion (16a) firmly abutted on an inner surface of the second horizontal flange (14a) and a second main lip portion (16b) firmly abutted on an inner surface of the second vertical flange (14b). Furthermore, the auxiliary seal member (20) includes a first auxiliary lip portion (20a) firmly abutted on an outer inclined surface of the second vertical flange (14b) and a second auxiliary lip portion (20b) firmly abutted on an upper vertical outer surface of the second vertical flange (14b).

The first seal frame (12), second seal frame (14) and third seal frame (18) are made of stainless steel of high corrosion-resistance because they are in danger of always being exposed to water or moisture. The main and auxiliary seal members (16, 20) are made of resilient polymer but may be made of a variety of other kinds of synthetic resins.

When the dual seal assembly (10) for a bearing according to the present invention is assembled, a lateral cross-section of the first horizontal flange (12a), a lower vertical outer surface of the second vertical flange (14b) and an outer surface of the third vertical flange (18b) are made to keep a straight line, and inner spaces thereof (a, b, c, d of FIG. 3) are filled with an adequate quantity of oil (grease) in order to prevent early wear and tear and degradation of the lip portions (16a, 16b, 20a, 20b) and to promote a smooth lubrication.

Figure 4:
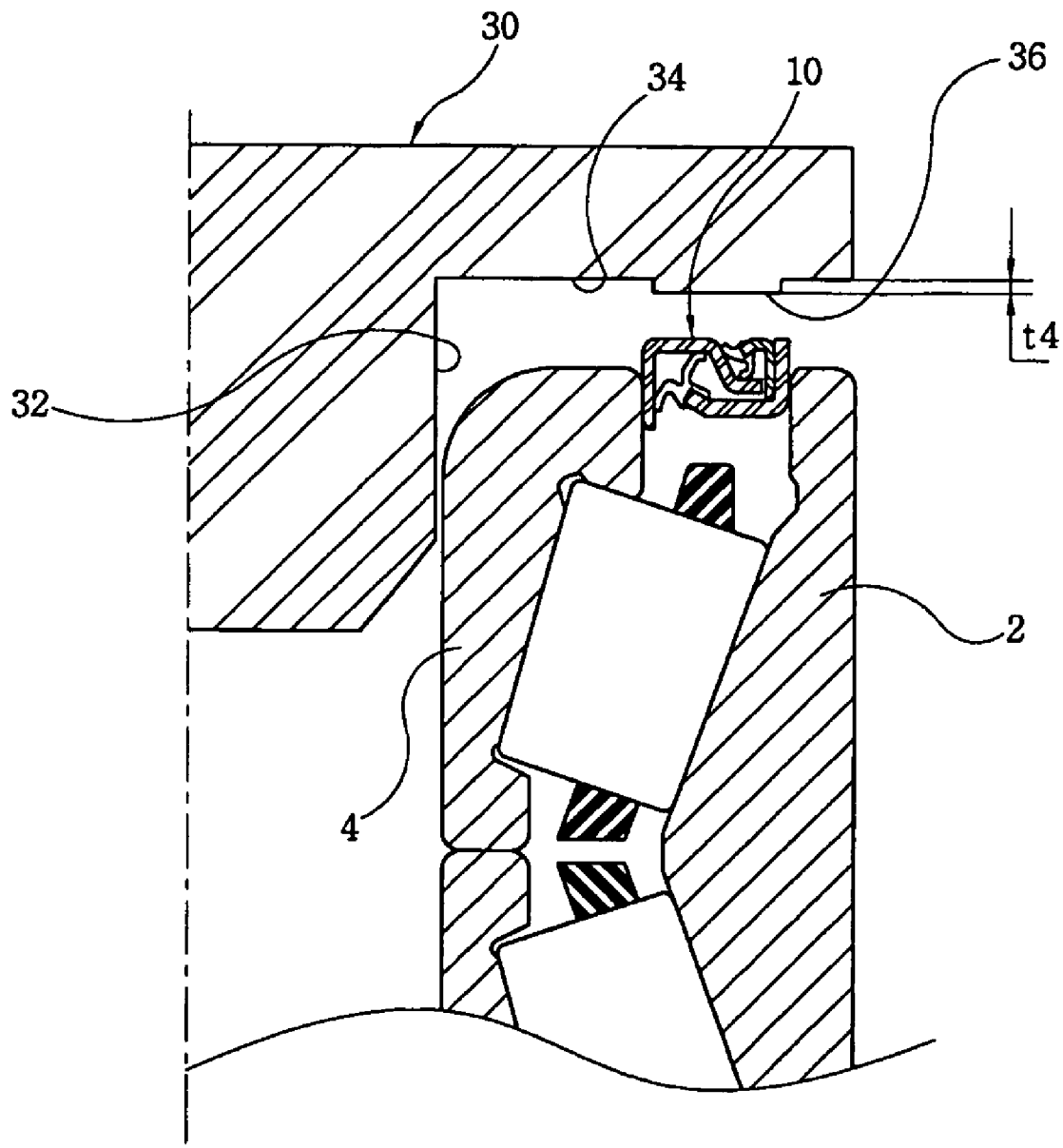
FIG. 4 is a structural view of a dual seal assembly for a bearing according to an embodiment of the present invention.

The dual seal assembly according to the present invention is inserted into the outer ring (2) and the inner ring (4) of the bearing by using an assembly jig (30) shown in FIG. 4 but this embodiment may be changed in response to assembling conditions and methods.

The assembly jig (30) comprises a guide surface (32) which is guided by the inner surface of the inner ring (4) of the bearing, a contact surface (34) which is firmly abutted on lateral surfaces of the inner and outer ring of the bearing, and a pressure-applying contact surface (36) protruding from a contact surface (34) at a prescribed height (t4) in order to apply pressure to the dual seal assembly by being firmly abutted on a lateral cross-section of the first horizontal flange (12a) of the dual seal assembly (10), a lower vertical outer surface of the second vertical flange (14b) and an outer surface of the third vertical flange (18b). The height (t4) may be determined by a distance made by the dual seal assembly

(10) advancing from lateral surfaces of the inner ring and outer ring to an interior of the bearing.

As illustrated in the drawing, when the guide surface (32) of the assembly jig (30) is guided by the inner surface of the inner ring (4) of the bearing, the pressure-applying contact surface (36) is firmly abutted on the dual seal assembly (10) to apply pressure to the dual seal assembly (10) and allow same to be pushed into a space formed between the inner ring and the outer ring. When the contact surface (34) is firmly abutted on lateral surfaces of the inner and outer rings, pressure is no longer applied to the dual seal assembly such that the dual seal assembly is inserted to an accurate depth in response to the protruding height (t4) of the pressure-applying contact surface (36).

In the dual seal assembly for a bearing according to the present invention, the first seal frame (12), the second seal frame (14) and the main seal member (16) initially seal a space formed between the outer ring (2) and the inner ring (4), and the third seal frame (18) and the auxiliary seal member (20) secondly seal a space formed between the first seal frame (12) and the second seal frame (14) such that sealing performance and preventing function of foreign objects are greatly improved.

Furthermore, in case the thickness of the first seal frame (12) is 0.6 mm, the thickness of the second seal frame (14) is 0.5 mm and the thickness of the third seal frame (18) is 0.4 mm, the entire width (t3 shown in FIG. 3) of the dual seal assembly may be designed from a minimum thickness of 3 mm. If this thickness of 3 mm is compared with that of a seal assembly according to the conventional vehicle hub bearing, it may be noticed that the present invention can realize a capacity increase and a compact design of a bearing.

Still furthermore, the lip portions (20a, 20b) of the auxiliary seal member (20) are firmly abutted on the vertical and horizontal slant surfaces to reduce the operational torque and to improve a sealing performance by way of a labyrinth function via the gaps (t1, t2).

Still furthermore, since the third seal (18) is press-fitted to the first seal frame (12), the third seal frame (18) cannot be separated unless it is forcibly disintegrated. Thus, it is convenient to control and handle the seal assembly before the seal assembly is mounted onto the bearing.

Figure 5:
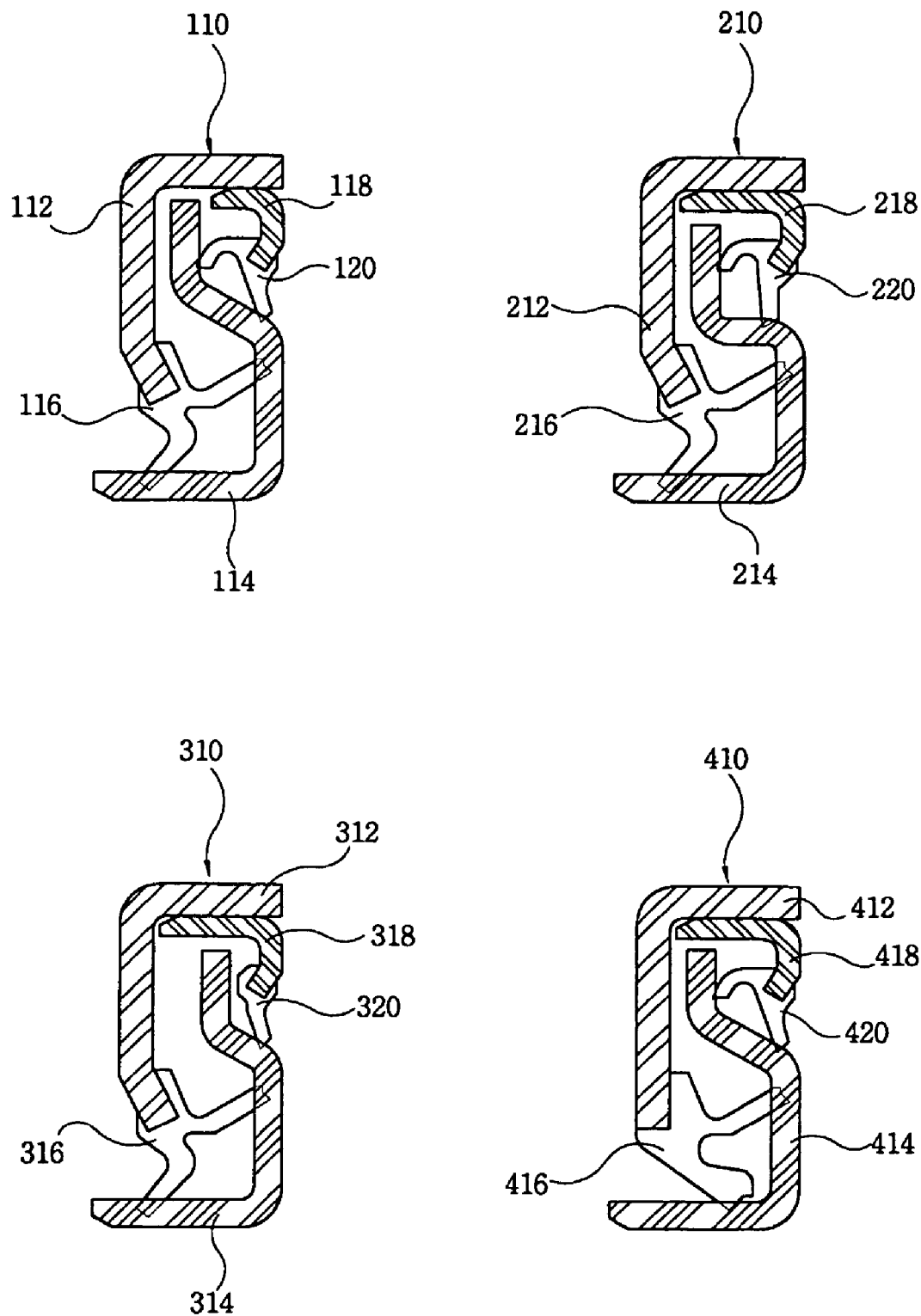
FIG. 5 shows a variety of modified examples of a dual seal assembly for a bearing according to the present invention.

Meanwhile, the dual seal assembly according to the present invention may be modified in various shapes such as the modified dual seal assemblies (110, 210, 310, 410) shown in FIG. 5. In FIG. 5, main seal members (116, 216, 316, 416) and auxiliary seal members (120, 220, 320, 420) are illustrated with no resilience force applied thereon. In other words, they are illustrated in a free state. First seal frames (112, 212, 312, 412), second seal frames (114, 214, 314, 414), third seal frames (118, 218, 318, 418), main seal members (116, 216, 316, 416) and auxiliary seal members (120, 220, 320, 420) are similarly constructed as those of FIG. 3, such that no further detailed description thereto is necessary. However, it should be noted that an auxiliary member (320) has one seal lip portion.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto, and their equivalents.

As apparent from the foregoing, there is an advantage in the dual seal assembly for a bearing according to the embodiments of the present invention in that the capacity of a bearing can be increased and the bearing can be compactly designed.

There is another advantage in that the operational torque is reduced and the sealing performance is improved, making it easy for a user to handle the seal assembly before the seal assembly is mounted onto a bearing and to an apparatus.

What is claimed is:

1. A dual seal assembly for a bearing, the assembly comprising:

a first seal frame coupled to a tip end of an opening in a space formed between an inner ring and an outer ring of the bearing and press-fitted to said outer ring;

a second seal frame press-fitted to the inner ring and a main seal member fitted to at least one of said first seal frame and said second seal frame for sealing a space formed between said first seal frame and said second seal frame;

a third seal frame interposed between said first seal frame and said second frame, and press-fitted to one of said first and second seal frames; and an auxiliary seal member inserted into said third seal frame to seal a gap formed between said first and said second seal frames;

wherein said first seal frame comprises: a first horizontal flange firmly inserted into an inner surface of said outer ring; and a first vertical flange vertically bent from an inner axial tip end of said first horizontal flange toward an inner radial direction;

said second seal frame comprises: a second horizontal flange firmly inserted into an outer surface of said inner ring; and a second vertical flange vertically bent from an outer axial tip end of said second horizontal flange toward an outer radial direction, and axially inclined and vertically bent toward a radial outer direction; and said third seal frame comprises: a third horizontal flange firmly press-fitted to an inner surface of said first horizontal flange; and a third vertical flange vertically bent from an outer axial tip end of said third horizontal flange toward an inner radial direction, wherein a first prescribed gap is formed between an inner surface of said first vertical flange and an upper inner surface of said second vertical flange and functions as a first labyrinth, a second prescribed gap is formed between an inner surface of said third horizontal flange and an upper end of said second vertical flange and functions as a second labyrinth, and said auxiliary seal member is inserted into a lower end of said third vertical flange and a lip member thereof is firmly abutted to an outer surface of said second vertical flange for sealing.

2. The assembly as defined in claim 1, wherein said auxiliary seal member comprises:

a first auxiliary lip portion firmly abutted on an outer inclined surface of said second vertical flange; and a second auxiliary lip portion firmly abutted on an upper vertical outer surface of said second vertical flange.

* * * * *